United States Patent
Baillie

(10) Patent No.: US 7,084,225 B2
(45) Date of Patent: Aug. 1, 2006

(54) PROCESS FOR PREPARATION OF A TETRAFLUOROETHYLENE COPOLYMER

(75) Inventor: Richard L. Baillie, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/052,333

(22) Filed: Feb. 7, 2005

(65) Prior Publication Data
US 2005/0222319 A1 Oct. 6, 2005

Related U.S. Application Data

(60) Continuation of application No. 10/338,589, filed on Jan. 8, 2003, which is a division of application No. 09/977,812, filed on Oct. 15, 2001, now Pat. No. 6,541,589.

(51) Int. Cl.
*C08F 214/26* (2006.01)
(52) U.S. Cl. ........................ 526/250; 526/242; 526/253; 428/502
(58) Field of Classification Search ................. 526/250, 526/242, 253; 428/502
See application file for complete search history.

(56) References Cited

U.S. PATENT DOCUMENTS

| | | | |
|---|---|---|---|
| 3,142,665 A | 7/1964 | Cardinal | |
| 3,391,099 A | 7/1968 | Punderson | |
| 4,016,345 A | 4/1977 | Holmes | |
| 4,078,134 A | 3/1978 | Kuhls | |
| 4,078,135 A | 3/1978 | Sulzbach | |
| 4,576,869 A * | 3/1986 | Malhotra | 428/502 |
| 4,636,549 A | 1/1987 | Gangal | |
| 4,792,594 A | 12/1988 | Gangal | |
| 5,506,281 A * | 4/1996 | Muhlbauer | 523/201 |
| 5,731,394 A * | 3/1998 | Treat et al. | 526/247 |
| 6,011,113 A | 1/2000 | Konabe | |
| 6,177,533 B1 | 1/2001 | Woodward | |
| 6,541,589 B1 * | 4/2003 | Baillie | 526/250 |
| 6,589,597 B1 * | 7/2003 | Ono et al. | 427/195 |

FOREIGN PATENT DOCUMENTS

| | | |
|---|---|---|
| JP | A9-359779 | 9/1999 |
| WO | WO 97/02301 | 1/1997 |

* cited by examiner

Primary Examiner—David W. Wu
Assistant Examiner—Henry S. Hu
(74) Attorney, Agent, or Firm—E. Alan Uebler, PA

(57) ABSTRACT

A polymerization process for producing a copolymer of tetrafluoroethylene and (perfluorobutyl)ethylene, prepared by an aqueous dispersion polymerization technique, and the resin produced thereby, are provided. This copolymer contains a relatively small amount, between about 0.02 weight percent and about 0.6 weight percent, of comonomer polymerization units. The copolymer is believed to be comprised of a core-shell structure wherein the polymerized comonomer units reside primarily within the core. The primary particle size of the copolymer ranges from 0.175 microns to and including 0.203 microns and the standard specific gravity is less than 2.143. This copolymer possesses a unique combination of very small particle size coupled with high molecular weight, a combination not heretofore achieved in tetra-fluoroethylene polymers of the dispersion or fine powder type. The process of this invention is characterized by permanganate initiation and the entire reaction is carried out in the absence of zinc chloride or other ionic strength enhancer. The addition of initiator must be stopped well before completion of the reaction, preferably at or before the mid-point of the complete reaction.

10 Claims, No Drawings

PROCESS FOR PREPARATION OF A TETRAFLUOROETHYLENE COPOLYMER

CROSS REFERENCE TO RELATED APPLICATIONS

This application is a continuation application of U.S. application Ser. No. 10/338,589, filed Jan. 8, 2003, titled TETRAFLUOROETHYLENE COPOLYMER, which was a divisional application of U.S. patent application Ser. No. 09/977,812, filed Oct. 15, 2001, now U.S. Pat. 6,541,589B1, issued Apr. 1, 2003.

BACKGROUND OF THE INVENTION

The invention relates to copolymers of tetrafluoroethylene and "(perfluorobutyl)"ethylene produced by aqueous dispersion polymerization.

Many prior patents disclose techniques for the dispersion polymerization of tetrafluoroethylene, and variations thereof. The dispersion polymerization of tetrafluoroethylene produces what has come to be known as "fine powder" resins. In such a process, sufficient dispersing agent is introduced into a water carrier such that, upon addition of tetrafluoroethylene in the presence of a suitable polymerization initiator and upon agitation, and under autogenous tetrafluoroethylene pressure of 10 to 40 kg./cm$^2$, the polymerization proceeds until the level of colloidally dispersed polymer particles is reached and the reaction is then stopped. See, e.g., U.S. Pat. No. 4,016,345 (Holmes, 1977).

Tetrafluoroethylene powders have also been produced by a process of suspension polymerization, wherein tetrafluoroethylene monomers are polymerized in a highly agitated aqueous suspension in which little or no dispersing agent may be employed. The type of powder produced in suspension polymerization is termed "granular" resin, or "granular powder". See, e.g., U.S. Pat. No. 3,655,611 (Mueller, 1972).

For both types of polymerization processes, copolymerization of tetrafluoroethylene with various fluorinated alkyl ethylene comonomers has been described. See, for example, U.S. Pat. No. 4,792,594 (Gangal, et al., 1988). The present invention relates to the aqueous dispersion polymerization technique wherein the product of the polymerization reaction is the copolymer of the invention dispersed within an aqueous colloidal dispersion. This process, generally, is one in which tetrafluoroethylene monomer is pressured into an autoclave containing water and certain polymerization initiators along with paraffin wax to suppress coagulum formation and an emulsifying agent. The reaction mixture is agitated and the polymerization is carried out at suitable temperatures and pressures. Polymerization results in the formation of an aqueous dispersion of polymer. The dispersed polymer particles may be coagulated by techniques known in the art to obtain fine powder polymer. When fluorinated alkyl ethylene comonomers are introduced into the polymerization, it is known that the comonomer reacts much faster than tetrafluoroethylene monomer, and comonomer addition rate is important to the distribution of comonomer achieved in the copolymer. When this comonomer is added as a single precharge, the comonomer is found in polymerized form mostly in the core or interior of the polymer particles. The comonomer may also be injected through some or all of the polymerization process and the injection sequence determines the structure of the shell, i.e., if comonomer is added throughout, it will reside throughout the outer shell of each copolymer particle.

Various prior patents have disclosed variations on techniques for the homopolymerization of tetrafluoroethylene and for the copolymerization of other monomers with tetrafluoroethylene. Among those are included U.S. Pat. No. 4,576,869 (Malhotra, 1986) and U.S. Pat. No. 6,177,533B1 (Jones, 2001). Within those references are contained certain procedures which have become, more or less, accepted procedures for determining certain defining and delineating properties associated with tetrafluoroethylene homopolymers and copolymers. Among those properties are:

(a) the Standard Specific Gravity (SSG), measured by water displacement of a standard molded test specimen, in accord with ASTM D-1457-90;

(b) Raw Dispersion Particle Size (RDPS), determined by spectrophotometry or other suitable technique. See, e.g., U.S. Pat. Nos. 4,016,345 and 4,363,900. The measurements herein were obtained by laser light scattering using a Brookhaven 90 plus instrument.

In the cited prior patents, and almost universally, the SSG of a homopolymer specimen has come to define its molecular weight, with the relationship being inverse, that is, a high molecular weight (MW) corresponds to a low SSG and, generally, the lower the SSG, the higher is the molecular weight. Addition of comonomer into the polymerization process may also reduce SSG and, for resins modified with comonomer, SSG may be used to infer variations in molecular weight at a given constant comonomer level.

For fluoroethylene fine powder polymers, generally, their RDPS range from about 0.175 microns and below to about 0.325 microns. These fine powder resins are known to be useful in paste extrusion processes and in stretching (expansion) processes in which the paste-extruded extrudate, after removal of extrusion aid lubricant, is stretched rapidly to produce porous, strong products of various cross-sectional shapes such as rods, filaments, sheets, tubes, etc. Such a stretching process is disclosed in U.S. Pat. No. 3,953,566 (Gore, 1976), assigned commonly with the instant invention.

Heretofore it has generally been accepted that, for tetrafluoroethylene homopolymers and copolymers of the dispersion type, it is difficult to achieve a resin which combines both desirable properties of small raw particle size (RDPS) coupled with a high molecular weight (MW). Expressing the same conclusion in a different, equivalent way, it is generally accepted that a dispersion resin possessing a small raw dispersion particle size (RDPS) and a low standard specific gravity (SSG) has been difficult or impossible to achieve.

This invention provides a dispersion type copolymer of tetrafluoroethylene and perfluorobutylethylene comonomer which possesses a heretofore unachieved combination of small fundamental resin particle size (RDPS) coupled with a low SSG (high MW).

SUMMARY OF THE INVENTION

A polymerization process for producing a tetrafluoroethylene copolymer, and the copolymer produced thereby, are provided. The copolymer is of the dispersion/fine powder type and contains polymerized tetrafluoroethylene monomer units and co-polymerized perfluorobutylethylene comonomer units in which the primary particles are believed to have a core and shell structure and the polymerized comonomer units are present in an amount from 0.02% by weight to 0.6% by weight, based upon total copolymer weight. The copolymer has a primary raw dispersion particle size (RDPS) in the range between 0.175 microns to and including 0.203 microns coupled with a standard specific gravity (SSG) of less than 2.143. Preferably the copolymer has comonomer units present in an amount from 0.05% by weight to 0.5% by weight and the RDPS is within the range between 0.178 microns and 0.200 microns coupled with a SSG of less than 2.140.

The copolymer may be dispersed within an aqueous dispersion and/or may be in the form of fine powder.

The process of the invention is characterized in that the copolymerization reaction is catalyzed by potassium permanganate initiator and the entire reaction is carried out in the absence of any multivalent ionic strength enhancer, such as zinc chloride. The addition of initiator is stopped well before completion of the reaction, preferably at or before the mid-point of the complete reaction. Also, and preferably, the comonomer is added as a precharge into the copolymerization reactor, although it may be added incrementally and intermittently through a portion of the polymerization reaction process.

DETAILED DESCRIPTION OF THE INVENTION AND PREFERRED EMBODIMENTS

A copolymer of tetrafluoroethylene and perfluorobutylethylene, prepared by an aqueous dispersion polymerization technique, is provided. This copolymer contains a relatively small amount, between about 0.02 weight percent and about 0.6 weight percent, of fluorinated comonomer polymerization units. The copolymer is believed to be comprised of a core-shell structure wherein the polymerized comonomer units reside primarily within the core. The primary particle size of the copolymer ranges from 0.175 microns to and including 0.203 microns and the standard specific gravity is less than 2.143. This resin is uniquely suited for use in an expansion (stretching) process, to produce high strength, highly porous tetrafluoroethylene polymeric articles.

The polymers of this invention provide the heretofore unachieved combination of properties wherein the fundamental particle size is very small and this is coupled with high molecular weight. These polymers are produced by a dispersion polymerization process, which is described in detail below and in the examples which follow. It can be seen from those examples, and drawing upon basic principles of dispersion polymerization of tetrafluoroethylene monomers, in particular, certain processing steps disclosed herein are critical.

More Specifically:

Initiation of Polymerization

The copolymer of this invention is produced by a polymerization process wherein the copolymerization reaction is catalyzed by a permanganate initiator, preferably potassium permanganate ($KMnO_4$), in the absence of any multivalent ionic strength enhancer, and the initiator addition is stopped completely, allowing the reaction to slow down and proceed to completion, at a point between 30% and 80% of the progression of the reaction toward completion. Preferably the initiator addition is stopped at about the mid-point of the reaction, i.e., at 40–65% to completion, and most preferably at about 44% of the completion of the reaction.

The perfluorobutylethylene comonomer is preferably added as a precharge in the reaction or, alternatively, it can be added incrementally only through a portion of the reaction.

Dispersing Agents

Substantially non-telogenic dispersing agents are used. Ammonium perfluoro octanoic acid (APFO or "C-8") is an acceptable dispersing agent. Programmed addition (precharge and pumping) is known and is preferred. Decreasing the precharge can lead to increased primary particle size.

Polymerization Control

It is known that ionic strength affects primary particle size control and dispersion stability. Care must be taken to have a sufficiently stable dispersion to enable completion of the polymerization without coagulating the dispersion and to have a sufficiently stable dispersion to survive transportation from the polymerization vessel to the coagulator. Inorganic salts have been precharged into the polymerization reactor with the intended effect of increasing the primary particle size. Multivalent ions, generally, are more effective in increasing ionic strength. Zinc chloride has been employed together with decreased APFO and intended to control (increase) the primary particle size. In the polymerization reaction of the present invention, however, multivalent ionic strength enhancers, such as zinc chloride, are omitted from the reaction.

It is known that particular attention must be paid to ingredient purity to achieve the desired properties in polymerizations as described herein. Ionic impurities, which can also increase ionic strength, in addition to soluble organic impurities, which can cause chain transfer or termination, must be minimized. It is clearly important to employ ultra pure water in all such polymerization reactions.

Additional Test Procedures

The break strength associated with an extruded and expanded (stretched) beading produced from a particular resin is directly related to that resin's general suitability for expansion, and various methods have been employed to measure break strength. The following procedure was used to produce and test expanded beading made from the copolymers of this invention:

For a given resin, blend 113.4 g. of fine powder resin together with 32.5 ml. of Isopar® K. Age the blend for about 2 hours at 22° C. in a constant temperature water bath. Make a 1 in. diameter cylindrical preform by applying about 270 psig of preforming pressure for about 20 seconds. Inspect the preform to insure it is crack free. Produce an extruded beading by extruding the preformed lubricated resin through a 0.100 in. diameter die having a 30 degree included inlet angle. The extruder barrel is 1 in. in diameter and the ram rate of movement is 20 in./min. The extruder barrel and die are at room temperature, maintained at 23° C., plus or minus 1.5° C. Remove the Isopar K from the beading by drying it for about 25 minutes at 230° C. Discard approximately the first and last 8 ft. of the extruded beading to eliminate end effects. Expand a 2.0 in. section of the extruded beading by stretching at 290° C. to a final length of 50 in. (expansion ratio of 25:1) and at an initial rate of stretch of 100% per second, which is a constant rate of 2 in. per second. Remove about a 1 ft. length from near the center of the expanded beading. Measure the maximum break load of the sample at room temperature (23° C. plus or minus 1.5° C.) using an an Instron® tensile tester using an initial sample length of 2 in. and a crosshead speed of 12 in./min. Measure in duplicate and report the average value for the two samples. This procedure is similar to that described in U.S. Pat. No. 6,177,533B1. The expansion here is carried out at 290° C. instead of 300° C.

EXAMPLES

Example 1

To a 50-liter, horizontal polymerization reactor equipped with a 3-bladed agitator was added 1.5 kg. paraffin wax, 28 kg. of de-ionized (DI) water, 18 g. of ammonium perfluorooctanoic acid (APFO) and 5 g. of succinic acid dissolved in about 50 grams of DI water. The reactor and contents were heated above the melting point of the wax. The reactor was repeatedly evacuated and pressurized (to about 1 atmosphere or less) with TFE until the oxygen level was reduced to 20 ppm or less. The contents were briefly agitated at about 60 rpm between evacuation and purge cycles to ensure that the water was deoxygenated. To the evacuated reactor under vacuum were added 8 ml. of PFBE as a precharge of comonomer, and the reactor was heated to 83° C. TFE was then added to the reactor until the pressure reached 2.8 Mpa, 3.0 kg., and $KMnO_4$ in DI water solution (0.063 g/L) was injected at 80 ml./min. until about 2.0 kg. of TFE had been added. This was accomplished in about 7 minutes. About 320 ml. of 20% APFO solution was added in 40 ml. increments, the first increment being added after about 1 kg. of TFE had been added to the reactor, and the subsequent increments added after each subsequent kg. of TFE had been added, so that the final increment was added after about 9 kg. of TFE had been charged. The $KMnO_4$ addition rate was decreased to 40 ml./min. at the 2 kg. TFE level and continued at this rate until about 3 kg. TFE had been added. The $KMnO_4$ addition rate was then further decreased to 20 ml./min. until about 5 kg. of TFE had been added. The $KMnO_4$ addition was then decreased to 10 ml./min. and addition was continued at this rate until about 7 kg. of TFE had been added to the reactor, at which time the addition of $KMnO_4$ was stopped.

The polymerization reaction was then allowed to continue and the reaction was stopped after about 16 kg. of TFE had been added to the reactor. The weight of the dispersion produced was 46.7 kg. and the density of the dispersion was 1.246 gm./ml. (35.0 wt. % solids).

No $KMnO_4$ was thus added after 44% of the TFE had been reacted. The dispersion was coagulated and dried at 170° C.

The raw dispersion particle size (RDPS) of the polymer particles was 0.203 microns and the standard specific gravity was 2.138. As can be seen, the level of comonomer in the polymerized product was 0.07 weight percent. The break strength of the beading was 7.9 lbs.

Example 2

The procedures for Example 1 were repeated except that 60 ml. of PFBE were added as a precharge to the reaction. The $KMnO_4$ was added in increments such that $KMnO_4$ solution was injected at a rate of 30 ml./min. until about 2480 ml. had been added, then the rate was adjusted to 40 ml./min. until an additional 1740 ml. had been added, and the rate was then reduced to 20 ml./min. until an additional 1640 ml. had been added, after which the $KMnO_4$ addition was stopped, at which point 6 kg. of TFE had reacted.

The polymerization was allowed to continue and the reaction was stopped after about 16 kg. of TFE had been added to the reactor. The weight of the dispersion produced was 49.7 kg. and the dispersion contained 35.7 wt. % solids.

The level of comonomer in the reaction product was 0.5 weight percent.

The RDPS of the polymer particles was 0.190 microns and the SSG was 2.135. The break strength of the beading was 9.0 lbs.

Example 3

The procedures for Example 1 were repeated except that 43 ml. of PFBE were added as a precharge to the reactor after which additional amounts of PFBE were added in increments during the polymerization reaction, a total of 14 ml. additional PFBE being added in 2–7 ml. increments. The first 7 ml. increment of PFBE was added after about 2 kg. of TFE had been injected into the reactor, and the second 7 ml. increment was added after 4 kg. of TFE were added.

The $KMnO_4$ was added beginning at a rate of about 54 ml./min., until 2000 ml. had been added, then the rate was reduced to about 50 ml./min. until an additional 900 ml. had been added, and the rate was again reduced to about 33 ml./min. until an additional 1780 ml. had been added, after which $KMnO_4$ addition was stopped. At this point, 6 kg. of TFE had reacted.

The polymerization was allowed to continue and the reaction was stopped after about 16 kg. of TFE had been added to the reactor. The weight of the dispersion produced was 50.7 kg. and the dispersion contained 33.9 wt. % solids.

The level of comonomer in the reaction product was 0.5 weight percent. It is seen that the initiation of polymerization was stopped at 38% of the complete reaction of the TFE.

The RDPS of the polymer particles was 0.176 microns and the SSG was 2.142. The break strength of the beading tested was 11.0 lbs.

Comparative Example A

Omitting PFBE Precharge

A polymerization reaction was conducted essentially as described in Example 3 except that the precharge of 43 ml. of PFBE was omitted and, instead, 49 ml. of PFBE were added in 7-7 ml. increments. The first 7 ml. increment was added after 1 kg. of TFE had been added. Subsequent increments were added after each additional kg. of TFE addition, with the last increment being added after the addition of the $7^{th}$ kg. of TFE.

The $KMnO_4$ solution was added initially at a rate of about 54 ml./min. until 910 ml. had been added, and the rate was reduced to about 20 ml./min. until an additional 400 ml. had been added, and then the rate was increased to about 40 ml./min. until a further 1600 ml. had been added, after which the $KMnO_4$ addition was stopped. At that point, 7 kg. of TFE had reacted, and a total of 2910 ml. of $KMnO_4$ solution had been added.

The polymerization was allowed to continue and the reaction was stopped after about 16 kg. TFE had been added to the reactor. The weight of the dispersion produced was 46.3 kg. and the density of the dispersion was 1.244 gm./ml. (34.8 wt. % solids). The dispersion was coagulated and dried at 180° C.

The RDPS of the polymer particles was 0.258 microns and the SSG was 2.145. The break strength of the beading was 7.7 lbs.

Comparative Example B

Excessive Precharge of PFBE

The reaction of Example 1 was repeated essentially as described except that 90.0 ml. of PFBE was precharged to the reactor instead of the 8 ml. described in Example 1. The KMnO$_4$ solution was added at a rate of about 53 ml./min., until about 5890 ml. had been added, at which point the experiment was terminated as a result of no reaction occurring.

Comparative Example C

Omitting PFBE

The reaction of Example 1 was repeated essentially as described except that no PFBE was added. The KMnO$_4$ solution was added beginning at a rate of about 60 ml./min. until 2.0 kgs. of TFE had been added, then the rate was reduced to about 40 ml./min. until 5 kgs. of TFE had been added, and reduced again to 20 ml./min., after which KMnO$_4$ addition was stopped, at which point 9 kg. of TFE had reacted and a total of 1250 ml. of KMnO$_4$ solution had been added.

The polymerization was allowed to continue and the reactor was stopped after a total of 16 kg. TFE had been added to the reactor. The weight of the dispersion produced was 45.7 kg. and the dispersion contained 36.7 wt. % solids. The dispersion was coagulated and dried at 170° C.

The RDPS of the polymer particles was 0.284 microns and the SSG was 2.158. The break strength of the expanded beading test sample was 6.9 lbs.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A process for the copolymerization of a tetrafluoroethylene copolymer of the fine powder type, said copolymer containing essentially from 99.4% by weight to 99.98% by weight tetrafluoroethylene monomer units and from 0.02% by weight to 0.6% by weight copolymerized (perfluorobutyl)ethylene comonomer units, comprising:
   (a) copolymerizing said monomer and comonomer in a pressurized reactor, and
   (b) initiating said copolymerization by adding potassium permanganate (KMnO$_4$),
   (c) carrying out the entire reaction in the absence of any ionic strength enhancer, and
   (d) stopping the addition of (KMnO$_4$) initiator at a point in the reaction no further than 80% of the reaction completion, wherein said polymerized comonomer units are present in an amount from 0.02% by weight to 0.6% by weight, based upon total copolymer weight; and said copolymer has a primary raw dispersion particle size (RDPS) in the range between 0.175 microns to and including 0.203 microns and has a standard specific gravity (SSG) of less than 2.143.

2. The process of claim 1 including adding the comonomer as a precharge in the copolymerization reaction.

3. The process of claim 1 including adding the comonomer incrementally and intermittently, from the beginning of the reaction through only a portion of the complete reaction.

4. The process of claim 1 including stopping the addition of KMnO$_4$ initiator at a point in the reaction no further than 60% of the reaction completion.

5. The process of claim 1 including stopping the addition of KMnO$_4$ initiator at a point in the reaction no further than 50% of the reaction completion.

6. The process of claim 1 wherein said copolymer has a RDPS in the range between 0.175 microns to and including 0.203 microns and has a SSG of less than 2.140.

7. The process of claim 6 including adding the comonomer as a precharge in the copolymerization reaction.

8. The process of claim 6 including adding the comonomer incrementally and intermittently, from the beginning of the reaction through only a portion of the complete reaction.

9. The process of claim 6 including stopping the addition of KMnO$_4$ initiator at a point in the reaction no further than 60% of the reaction completion.

10. The process of claim 6 including stopping the addition of KMnO$_4$ initiator at a point in the reaction no further than 50% of the reaction completion.

* * * * *